A. T. PALMER.
RAIL JOINT.
APPLICATION FILED NOV. 18, 1915.
1,192,103.
Patented July 25, 1916.
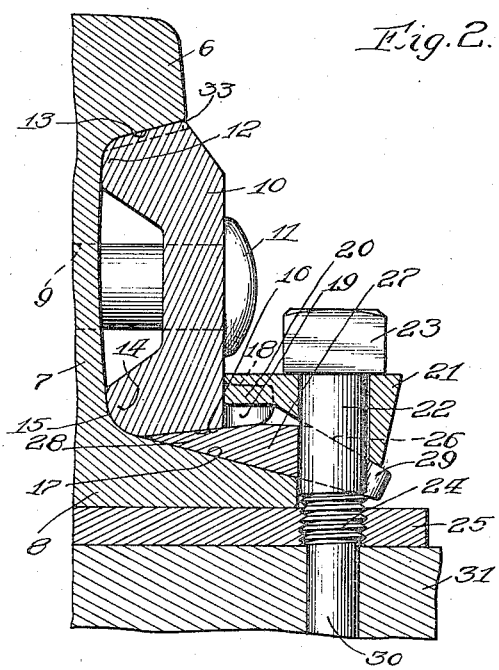
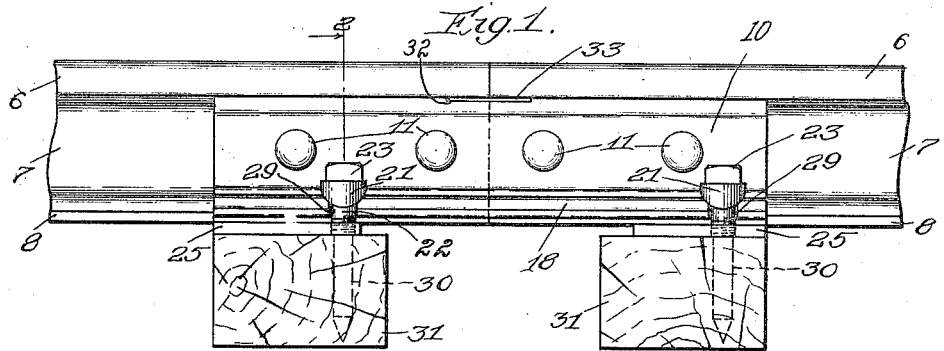
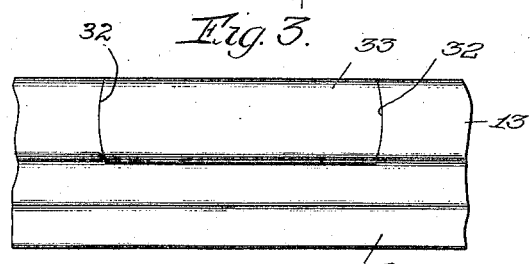
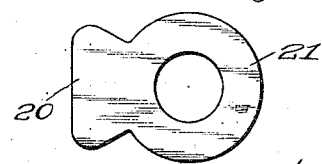
Inventor:
Alphonso T. Palmer,

UNITED STATES PATENT OFFICE.

ALPHONSO T. PALMER, OF CICERO, ILLINOIS.

RAIL-JOINT.

1,192,103. Specification of Letters Patent. Patented July 25, 1916.

Application filed November 18, 1915. Serial No. 62,135.

*To all whom it may concern:*

Be it known that I, ALPHONSO T. PALMER, a citizen of the United States, residing at Cicero, in the county of Cook and State of Illinois, have invented a new and useful Improvement in Rail-Joints, of which the following is a specification.

My invention relates to rail joints, and has for its object the construction of a simple and efficient joint of the character mentioned which is rigid, and one which may be easily and quickly adjusted to take up wear.

A further object is the provision of means for reducing wear on the fish plates thereof.

Other objects will appear hereinafter.

An embodiment of my invention is shown in the accompanying drawing forming a part of this specification, and in which—

Figure 1 is a side elevation of a rail joint embodying my invention; Fig. 2 is an enlarged fragmental section taken on line 2—2 in Fig. 1; Fig. 3 is an enlarged top view of a portion of one of the fish plates showing the hardened plate secured therein; and Fig. 4 is a plan view of a follower used in the construction.

My invention is adapted for embodiment in rail joints for joining rails of conventional patterns where the rail ends are in abutting relation.

The improvement consists in the novel form of fish plates, and means for keeping them in proper positions to maintain the joint tight.

It further consists in means for taking up wear in the joints.

Referring more particularly to the drawing, the rail ends have the usual heads 6, webs 7 and flanges 8. The flanges 8 are perforated, as at 9, with the usual round holes for securing the fish plates across the ends of the abutting rails. On each side of the webs 7 of the rail ends I position a fish plate 10, and rigidly secure such fish plates to the rail ends by means of rivets 11, passing through the fish plates and perforations 9 in the webs 7. The rivets 11 are riveted so that their heads engage tightly against the outer sides of the fish plates 10, thereby securing the fish plates to the rail ends to form a substantially rigid joint and still permit the joint to give sufficiently to accommodate contraction and expansion of the parts. The fish plates 10 are provided with portions 12, which engage the under sides 13 of the rail heads 6 and reach down for a short distance on the webs 7, thereby providing contacting surfaces between the fish plates and the lower surfaces of the heads 6, and a short distance on the webs 7. Along the lower edges of the fish plates 10 are portions 14, which engage portions of the rail ends at the juncture between the webs 7 and flanges 8, as at 15. The lower edges 16 of the fish plates 10 are preferably inclined surfaces, being inclined upwardly away from the flanges 8. The top surfaces of the flanges 8, as is the usual custom, are inclined toward the webs 7, thereby providing acute angles between the lower surfaces 16 of the fish plates 10, and the upper surfaces 17 of the flanges.

Along the outer side adjacent the lower edge of each fish plate 10 is an extension 18, which is provided with dove-tailed notches 19 therein. In each of said notches is a dove-tailed projection 20 formed on a follower or washer 21. Each follower 21 is perforated, and a bolt 22 is passed therethrough with its head 23 engaging the upper surface of the washer. Each bolt 22 is provided with a threaded portion 24, threaded in a tie plate 25 under one of the rail joints. The lower surface of the follower 21 is inclined, and adapted to rest on an inclined surface 26 of a wedge 27 in such a manner that when the toe portion 28 of the wedge is driven tightly between the inclined surfaces 16 and 17, and the bolt 22 adjusted with its head tightly against the follower 21, retrograde movement of the wedge is impossible, owing to the angle of the inclined surfaces between the wedge and the follower 21. The heel portion of the wedge 27 is cut away or notched, as at 29, providing means whereby the wedge 27 may be adjusted or driven in between surfaces 16 and 17 when so desired.

The bolts 22 are each provided with an extension 30 adapted to pass into a railway tie 31, and secure the joint to such railway tie. In practice a hole is preferably drilled or bored in the tie 31 of slightly smaller diameter than the diameter of portion 30. In applying the bolt 22 to the joint and tie, it is driven into the tie until its threaded portion 24 engages the plate 25. Then a wrench, not shown, is applied to the head 23, and turned until the head 23 engages the top of follower 21 and binds the wedge tightly in the joint. After the joint is used for a time some wear will occur, and in order to again make the joint rigid the wedge 27 is driven tighter in between surfaces 16 and 17 to make the fish plates again tight on the joints. Then the bolt 23 is turned until follower 21 again tightly engages the wedge 27. The friction on the portion 30 of the bolt 22 serves as a means for preventing retrograde movement of the bolt when once set in a desired position. The inclination of the surfaces on the lower edges of the fish plates 10 is such that the wedges 27 exert forces both upwardly and toward the webs 7, thereby relieving rivets 11 of a considerable amount of the strain which would be placed thereon if the joint were not provided with such a wedge as shown, or its equivalent.

It has been found that the passing of trains, not shown, over rail joints causes the ends of the rails to move downwardly as such train passes thereover. This downward movement of the rail ends causes the sharp edges of the under sides of the heads 6 to cut into the fish plates 10. In order to overcome this I have cut away portions on the fish plates, as at 32, and fitted in each of such cut-away portions a hardened plate 33, which engages the under sides of the heads of both rail ends at each joint. Since these plates 33 are not required to withstand bending strains they are made very hard, thereby preventing the rail ends from cutting into said tie plates.

While I have illustrated and described the preferred form of construction of my invention, I do not desire to be limited to the precise details set forth, but desire to avail myself of such variations and changes as come within the scope of the appended claims.

I claim:

1. A rail joint comprising a pair of abutting rail ends having the usual heads, webs and flanges; fish plates secured to the rail ends and engaging the upper and lower edges of the webs of the rail ends; tie plates on the under sides of the flanges of the rail ends; a wedge between the lower edge of each fish plate and the flanges of the rail ends adjacent such lower edge; and bolts passing through the tie plates and having connections with the wedges holding the latter against retrograde movement.

2. A rail joint comprising a pair of abutting rail ends having the usual heads, webs and flanges, the upper sides of the flanges being inclined toward the webs; fish plates secured to the rail ends and engaging the upper and lower edges of the webs, the lower edge surfaces of the fish plates being inclined away from the webs and meeting the upper sides of the flanges at relatively sharp angles; tie plates on the under sides of the flanges; wedges having their toe portions disposed between the inclined surfaces of the fish plates and flanges; and headed bolts threaded in the tie plates at the outer edges of the flanges, extending across the heels of the wedges and connected with the latter to hold the wedges against retrograde movement.

3. A rail joint comprising a pair of abutting rail ends having the usual heads, webs and flanges; fish plates secured to the rail ends and engaging the latter at the junctures of the webs and flanges, and webs and heads thereof; tie plates under the rail ends; wedges between the lower edges of the fish plates and the flanges of the rail ends adjacent such edges, there being notches in the rear edges of the wedges and inclined surfaces adjacent such notches; and headed bolts passing through the tie plates and said notches, said bolts exerting force downwardly on said inclined surfaces and holding the wedges in operative positions.

4. A rail joint comprising a pair of abutting rail ends having the usual heads, webs and flanges; fish plates secured to the rail ends and engaging the latter at the junctures of the webs and flanges, and webs and heads thereof; tie plates under the rail ends; wedges between the lower edges of the fish plates and the flanges of the rail ends adjacent such edges, there being notches in the rear edges of the wedges and inclined surfaces adjacent such notches; headed bolts passing through the tie plates and said notches; and followers on the bolts against the heads of the latter and having inclined lower surfaces engaging the inclined surfaces of the wedges holding said wedges against retrograde movement.

5. A rail joint comprising a pair of abutting rail ends having the usual heads, webs and flanges; fish plates secured to the rail ends and engaging the latter at the junctures of the webs and heads, and wedges and flanges thereof; tie plates under the rail ends; wedges between the lower edges of the fish plates and flanges of the rail ends adjacent such edges there being notches in the rear edges of the wedges; headed bolts threaded in the tie plates and passing through said notches; followers on the bolts and between the heads of the bolts and wedges holding the latter in operative positions; and projections on the followers dove-tailed in the lower edges of the fish plates.

6. A rail joint comprising a pair of abutting rail ends having the usual heads, webs and flanges; fish plates secured to the rail ends and engaging the upper and lower edges of the webs of the rail ends; tie plates on the under sides of the flanges of the rail ends; a wedge between the lower edge of each fish plate and the flanges of the rail ends adjacent such lower edge; and bolts passing through the tie plates and having connections with the wedges holding the latter against retrograde movement, the lower end portions of the bolts extending below the tie plates and providing means adapted for securing the rail joint to a railway tie.

7. A rail joint comprising a pair of abutting rail ends having the usual heads, webs and flanges; fish plates secured to the sides of the rail ends tying the latter together; and hardened plates set in the fish plates and engaging both rail ends adapted to reduce wear on the fish plates.

8. A rail joint comprising a pair of abutting rail ends having the usual heads, webs and flanges; fish plates secured to the rail ends and engaging the latter at the junctures of the webs and flanges, and webs and heads thereof; and hardened plates set in the fish plates and engaging the under sides of the heads of the rail ends, said hardened plates being adapted to prevent the edges of the rail end heads from wearing adjacent portions of the fish plates.

In testimony whereof I have signed my name to this specification, in the presence of two subscribing witnesses, on this 16th day of November, A. D. 1915.

ALPHONSO T. PALMER.

Witnesses:
 CHARLES H. SEEM,
 THOMAS COLSON.